United States Patent

[11] 3,549,935

| [72] | Inventors | Kakujiu Motoyama;<br>Hiroshi Yako, Yokohama-shi, Japan |
| --- | --- | --- |
| [21] | Appl. No. | 752,287 |
| [22] | Filed | Aug. 13, 1968 |
| [45] | Patented | Dec. 22, 1970 |
| [73] | Assignee | Tokyo Shibaura Electric Co., Ltd.<br>Kawasaki-shi, Japan<br>a corporation of Japan |
| [32] | Priority | Aug. 17, 1967 |
| [33] | | Japan |
| [31] | | No. 42/70945 |

[54] HEADLIGHT LAMP FOR AUTOMOBILES HAVING SIDE REFLECTORS AND FILAMENTS TO FACILITATE VISION WHEN MAKING TURNS
4 Claims, 7 Drawing Figs.

[52] U.S. Cl...................................................... 313/114;
240/41.35, 313/115
[51] Int. Cl........................................................ H01j 5/16,
H01j 61/40
[50] Field of Search............................................ 240/8.24,
8.25, 41(SBU), 41.35, 41.35(C), 41.35(D),
41.35(F); 313/113, 114, 115, 116, 117

[56] References Cited
UNITED STATES PATENTS
| 1,796,530 | 3/1931 | Melish.......................... | 240/8.24X |
| 3,010,045 | 11/1961 | Plagge et al................... | 313/113 |

*Primary Examiner*—James W. Lawrence
*Assistant Examiner*—David O'Reilly
*Attorney*—George B. Oujevolk ABSTRACT: A headlight lamp for automobiles comprising side reflectors symmetrically disposed on opposite sides of central reflector and side filaments disposed within side reflectors for side illumination in addition to forward illumination.

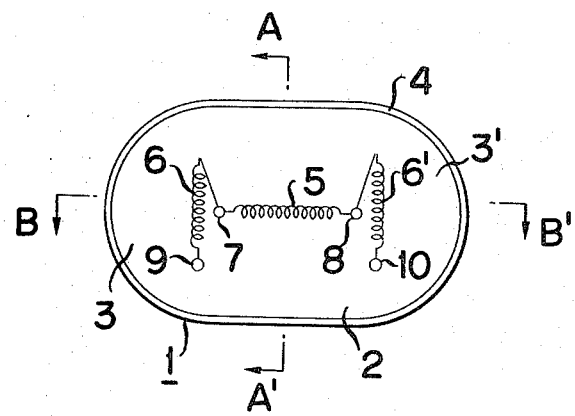
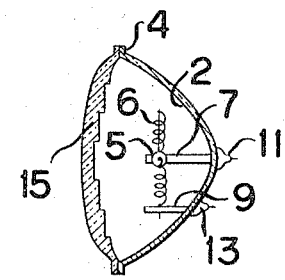
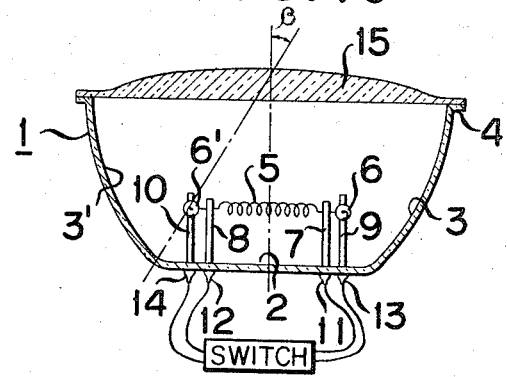
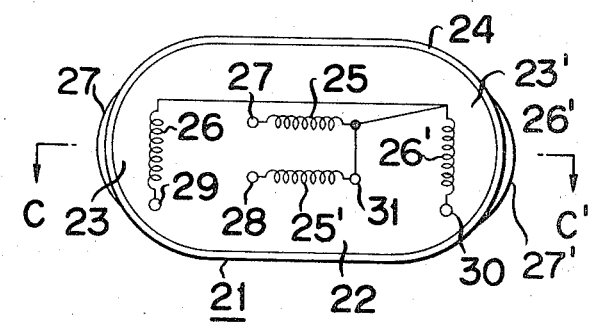

HEADLIGHT LAMP FOR AUTOMOBILES HAVING SIDE REFLECTORS AND FILAMENTS TO FACILITATE VISION WHEN MAKING TURNS

The present invention relates to headlight lamps for automobiles, and, in particular, to headlight lamps which can positively throw light in the advancing direction at the time of right or left turn.

Generally, headlight lamps of automobiles are provided on the front end of the car body. Within the lamp bulb of the headlight there are provided a main or driving beam filament for throwing light upon a distant subject and an auxiliary or passing beam filament for illuminating a near by subject. The auxiliary filament is intended to be switched from the driving beam filament, when a running car encounters another coming from the opposite direction, so as to prevent the driver from mishandling the car due to his eyes being dazzled by glare.

Figure 4:
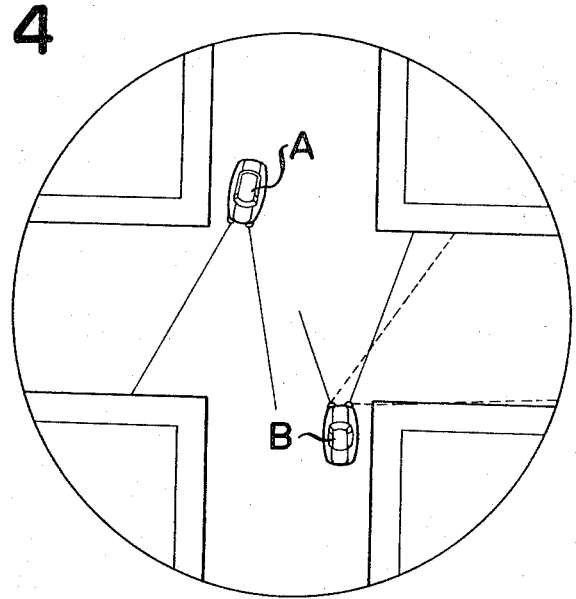

When a car having the aforementioned headlight lamps makes a turn, particularly a right turn, it is impossible to illuminate in the direction in which it is going to turn (as shown by car A in FIG. 4). As a result, at relatively dark corners without any street light it is impossible to catch sight of obstacles and holes in the advancing direction.

In order to overcome the aforementioned drawbacks it has been proposed to provide side lights separately of headlight lamps. This proposal, however, is not practical as it requires complex construction and spoils car design.

An object of this invention is to provide a headlight lamp for automobiles, which is simple in construction and ensures sidewise illumination when a car makes a turn.

According to the invention, there is provided a headlight lamp comprising a reflector assembly, a filament assembly disposed within said reflector assembly and a front lens disposed on said reflector assembly, characterized in that said reflector assembly consists of a central portion for reflecting light forwardly and two integral side portions symmetrically disposed on opposite sides of said central portion for reflecting light sideways, and that said filament assembly consists of at least one forward illumination filament disposed within and in opposition to said central portion and a pair of side illumination filaments respectively disposed within and in opposition to said side portions.

Figure 2B:
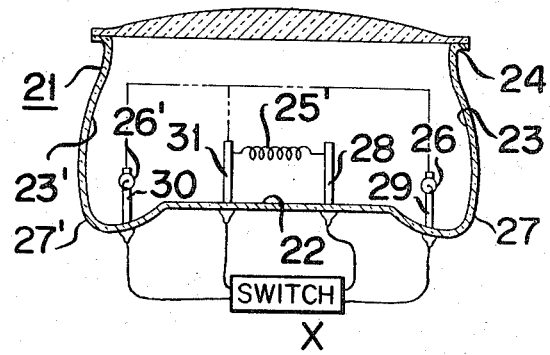
Figure 3:
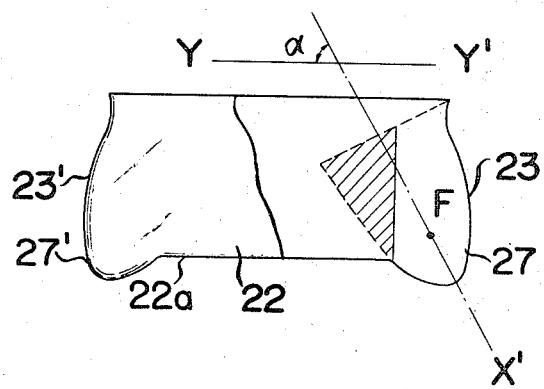

IN THE DRAWING:

FIG. 1a is a plan view of one embodiment of a headlight lamp according to the invention;
FIG. 1b is a side section taken along line A-A' of FIG. 1a;
FIG. 1c is a section taken along line B-B' of FIG. 1a;
FIG. 2a is a plan view of a modified embodiment of the invention;
FIG. 2b is a side section taken along line C-C' of FIG. 2a;
FIG. 3 is a view for explanation of the construction of the modification shown in FIGS. 2a and 2b; and
FIG. 4 is a schematic view illustrating the range of illumination at the time of right turn of a car provided with the headlight lamps according to the invention and one provided with conventional headlights.

The invention is now described in connection with preferred embodiments thereof with reference to the accompanying drawing.

Referring now to FIGS. 1a to 1c inclusive which illustrate one embodiment of the headlight lamp according to the invention, the reference numeral 1 designates a reflector assembly of the headlight lamp. It consists of integral portions 2, 3 and 3' and is substantially in the form of a boat with a peripheral edge 4 around the opening.

The inner surface of said central reflector portion 2 has a cross section depicting a parabola and has a linear side section. It serves to reflect light forwardly of the car, and is hereinafter termed "forward reflector." On both sides of said reflector portion 2, there are symmetrically disposed side portions 3 and 3' which take a shape of split paraboloid and are hereinafter termed "side reflector."

The forward and side reflector portions constituting reflector assembly 1 are made by molding hard glass, and their wall thickness is about 5 mm. The inside surface of the molding is deposited with aluminum to form an aluminum thin layer for light reflection. The axes of said side reflectors 3 and 3' are respectively inclined inwardly by an angle $\beta$ of about 30° to 45° against the axis of said forward reflector 2.

Within the forward reflector 2 there is disposed a filament 5 for illuminating ahead of the car, which extends along a line of focal points of parabolic walls of the reflector and is connected between a pair of lead wires 7 and 8. Within side reflectors 3 and 3' there are disposed filaments 6 and 6' for illuminating sideways of the car at positions respectively including focal points of the side reflectors 3 and 3'. In the present embodiment, side filament 6 is connected at one end to lead wire 7 and at the other end to lead wire 9, while side filament 6' is connected at one end to lead wire 8 and at the other end to lead wire 10. As is seen from FIGS. 1b and 1c forward filament 5 and side filaments 6 and 6' are arranged at right angles with each other.

The lead wires 7, 8, 9 and 10 are respectively connected to terminals 11, 12, 13 and 14 mounted outside of reflector assembly 1 for connection to power source through a changeover switch (not shown). The reflector assembly 1 carrying forward filament 5 and side filaments 6 and 6' has its opening covered with a front lens 15 of hard glass as shown in FIG. 1b. The peripheral edge of the front lens 15 is fusion sealed with the peripheral edge 4 of the reflector assembly 1 to complete a sealed beam-type lamp.

FIGS. 2a and 2b show a modified embodiment. In this modification, a reflector assembly 21 comprises central or forward reflector 22 of which cross section depicts a parabola, side reflectors 23 and 23' of paraboloid symmetrically disposed on opposite sides of the central reflector 22 and respectively having expanded portions or apex portions 27 and 27' extending rearwardly from the apex 22a of said forward reflector 22, and a peripheral or protruding edge 24 formed around the opening of said reflector assembly 21. A filament assembly of this modified headlight lamp includes forward filaments 25 and 25' and side filaments 26 and 26'. Reference numerals 27 to 31 designate lead wires respectively connected to terminals extending outside of the reflector assembly 21. As is seen from the drawing, forward filaments 25 and 25' and side filaments 26 and 26' have one end electrically commonly connected to lead wire 31.

FIG. 3 further illustrates the construction of the reflector assembly 21. The side reflector 23, which as described is formed into a shape of paraboloid, has its axis XX' through a focal point F directed to define an angle $\alpha$ with respect to the direction YY' vertical to the axis of the forward reflector 22. The angle $\alpha$ is usually chosen to be 45 to 60°, and may be made wider for high-speed automobiles. Since the side reflector 23 lacks as paraboloid the shaded portion as shown, it reduces the efficiency of sideward illumination. This drawback is eliminated by increasing the expanded portion 27 to make the effective area for reflection of the reflector 23 at 60 to 70 percent.

The forward filaments 25 and 26' are disposed in the vicinity of and parallel to the focal line of the forward reflector 22, while the side filaments 26 and 26' are disposed at positions including focal points of the side reflectors 23 and 23'. Exemplary values of wattages for the filaments are 75 watts for filament 25, 50 watts for filament 25', and 50 watts for filaments 26 and 26'.

In the modified reflector assembly 21, where the curved surface of the side reflectors 23 and 23' is represented in cartesian rectangular coordinates by an expression $Z = Ax^2 + By^2$ (A, B: constant values) and where $A = B$ in the expression, the forward reflector 22 is formed into a body of revolution. In order to enable throwing light in the desired direction, a known switching mechanism is provided in the driver's seat.

By setting the switching mechanism to the position for forward illumination only forward filament is lit, while by setting the mechanism to the position for right or left side illumination the forward filament and either one of the left and right side filaments are simultaneously lit.

With these constructions, when a running car with its headlight lamps illuminating ahead, as indicated by solid lines at B in FIG. 4, is to make a right turn the side filament for right side illumination is turned on in addition to the forward filament, so as to illuminate in the direction in which the car is to turn as shown by dotted lines at B in FIG. 4, simultaneously with the forward direction. Accordingly, an illumination angle of substantially 90° from the direct forward direction up to the right side of the car may be ensured. As it is possible to illuminate the direction in which the car is to turn prior to the actual turning of the car, which has heretofore not been realized, pedestrians crossing the road, obstacles such as stones on the road, holes and pools may be readily identified, whereby accidents may be prevented from occurring and extremely safe driving can be assured.

In case of left turn, the aforementioned headlight lamp may be operated in the similar manner as for the right turn. It is possible to arrange the left and right side filaments such that they are lit simultaneously. Further, the switching operation of the side filament at the time of right or left turn may be geared with the operating lever of the direction indicator.

We claim:

1. In a headlight lamp for automobiles having a reflector assembly, a filament assembly disposed within said reflector assembly and a front lens disposed on said reflector assembly, the improvement therein wherein said reflector assembly consists of a central elongated portion for reflecting light forwards and two integral side portions symmetrically disposed on opposite sides of said central portion for reflecting light sideways, said filament assembly having at least one forward illumination filament disposed within and in opposition to said central portion, a pair of side illumination filaments respectively disposed within and in opposition to said side portions and lead lines from said forward and side filaments for connection to switch means to selectively enable said filaments.

2. A headlight lamp according to claim 1, wherein the axis of each of said side reflectors defines an angle of 30° to 45° with respect to the axis of said central portion of said reflector assembly.

3. A headlight lamp according to claim 2, wherein said side reflectors have paraboloidal walls and that said side filaments are disposed at positions containing foci of said paraboloidal walls.

4. A headlight lamp according to claim 3, wherein said side reflectors each has an expanded portion to improve the efficiency for sideward illumination.